United States Patent [19]
Katsuta

[11] Patent Number: 5,619,669
[45] Date of Patent: Apr. 8, 1997

[54] MEMORY WAIT CYCLE CONTROL SYSTEM FOR MICROCOMPUTER

[75] Inventor: Hiroshi Katsuta, Tokyo, Japan

[73] Assignee: NEC Corporation, Tokyo, Japan

[21] Appl. No.: 60,955

[22] Filed: May 12, 1993

[30] Foreign Application Priority Data

May 12, 1992 [JP] Japan .................................. 4-118671

[51] Int. Cl.⁶ .................................................. G06F 12/00
[52] U.S. Cl. ...................... 395/405; 395/497.02; 395/481
[58] Field of Search .................................. 395/400, 425, 395/497.01, 497.02, 497.03, 497.04, 402, 405, 481; 364/200 MS File, 900 MS File

[56] References Cited

FOREIGN PATENT DOCUMENTS 2160184  2/1992  Japan.
0449442  2/1992  Japan.

*Primary Examiner*—Jack A. Lane
*Attorney, Agent, or Firm*—Whitham, Curtis, Whitham & McGinn

[57] ABSTRACT

A memory control system comprises a plurality of base address registers each for designating a base address of a corresponding memory block, and a corresponding number of block size registers each for designating the size of the corresponding memory block. An output of one base address register and an output of be corresponding block size register are supplied to a corresponding comparator, and compared with MSB bits of a memory access address. An output of the comparator selectively activates, in accordance with the order of priority, a corresponding memory control register which designates a wait state number for the corresponding memory block, so that the wait state number is outputted.

9 Claims, 6 Drawing Sheets

FIGURE 2
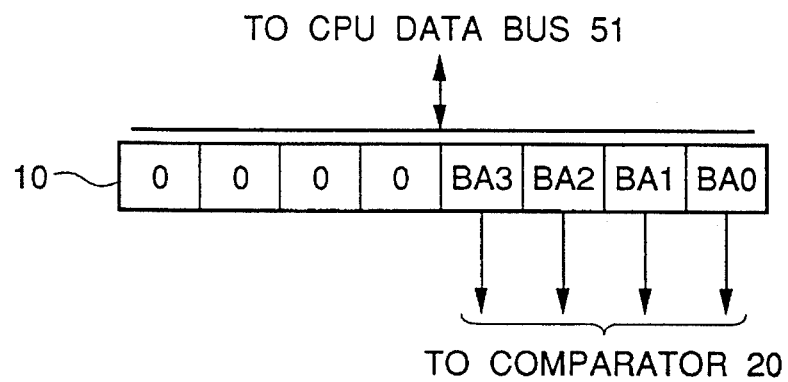
FIGURE 3
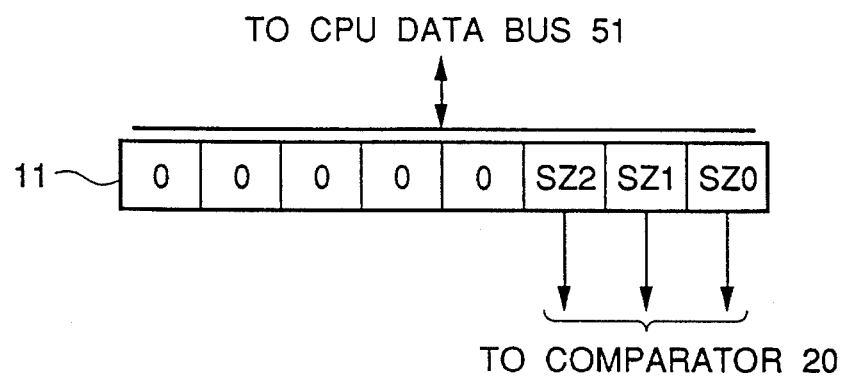
FIGURE 4
| BLOCK SIZE REGISTER DESIGNATION | | | BLOCK SIZE | BASE ADDRESS REGISTER DESIGNATION | | | |
|---|---|---|---|---|---|---|---|
| SZ2 | SZ1 | SZ0 | | BA3 | BA2 | BA1 | BA0 |
| 0 | 0 | 0 | 1M BYTE | X | X | X | X |
| 0 | 0 | 1 | 512K BYTE | A19 | X | X | X |
| 0 | 1 | 0 | 256K BYTE | A19 | A18 | X | X |
| 0 | 1 | 1 | 128K BYTE | A19 | A18 | A17 | X |
| 1 | X | X | 64K BYTE | A19 | A18 | A17 | A16 |
X : Don't Care
A19~A16 : MSB 4-BIT ADDRESS OF MEMORY BLOCK (PWC2,PWC1,PWC0)=(0,0,0)  : 0 WAIT (PWC2,PWC1,PWC0)=(0,0,1)  : 1 WAIT (PWC2,PWC1,PWC0)=(0,1,1)  : 3 WAITS

DEFAULT SPACE IS 7 WAITS

MEMORY WAIT CYCLE CONTROL SYSTEM FOR MICROCOMPUTER

BACKGROUND OF THE INVENTION

1. Field of the Invention

The present invention relates to a memory control system for use in a microcomputer, and more specifically to a memory control system for a memory address management in a microcomputer.

2. Description of Related Art

Recently, application fields of microcomputers are more and more increasing so as to cover office automation instruments such as a printer and a facsimile and other instruments and apparatuses. Function and performance of these instruments have remarkably increased, and correspondingly, a program for a so called system control has been increased, and the amount of required data processing has also become voluminous. In addition, the capacity of the memory consumed in the system continues to increase.

Furthermore, various type memory devices have been required in accordance with their use purposes. For example, a non-volatile memory such as a ROM (read only memory) and a PROM (programmable ROM) is used for storing a fixed data such as a program and graphic information for character fonts, and a volatile memory such a static RAM (random access memory) and a dynamic RAM is used for storing temporary processing data such as program variables.

Under the above mentioned circumstance, as one means for increasing the performance of the system, them is a memory management system for efficiently utilizing various large-scaled memories, and various memory control systems have been known.

In one typical conventional memory control system, a memory of a microcomputer is managed by dividing the memory space into a plurality of memory areas having a relative small memory capacity, which is called a bank. For example, a full memory space of 1M byte (M:Mega=$2^{20}$) is partitioned into 16 banks ("BANK 0" to "BANK 16") each of which is composed of 64K byte (K:Kilo=$2^{10}$). A wait cycle can be inserted into a memory access cycle performed for each of the banks, and the number of waits can be designated for each of the banks.

Here, the designation of the wait number is performed by setting a predetermined data into a designation register. For example, a wait number designation bit of three bits is assigned in the designation register. If "0, 0, 1" is set, a wait cycle of one state is inserted, and if "0, 1, 0" is set, a wait cycle of two states is inserted. If "1, 1, 1" is set, a wait cycle of maximum seven states can be inserted.

Generally, if the wait cycle is inserted in an ordinary memory access cycle, it results in drop of performance of the overall system. For example, if the wait cycle of one state is inserted into the memory access cycle which should ordinarily be completed with three states, the performance drop of about 33% occurs each time one memory access time concerned is generated.

On the other hand, in order to avoid insertion of the wait cycle, it is necessary to use a high speed memory device, and correspondingly, the overall system becomes expensive. Therefore, it is necessary to insert a minimum number of wait cycles in consideration of the cost performance of the system and the memory structure, and it is also necessary to independently designate the wait number for each of the banks, in order to be able to comply with various system constructions.

For this purpose, a first designation register is allocated for "BANK 0", and similarly, second to sixteenth designation registers are allocated for "BANK 1" to "BANK 15, respectively. In addition, the respective designation registers are set in the course of execution of an initializing routine of the program, so that a predetermined number of wait cycles is automatically inserted in the memory access to each of the banks.

On the other hand, assume that a mask ROM for the program is assigned to "BANK 0", a static RAM for program variables is assigned to "BANK 1" and "BANK 2", and a dynamic RAM for processing data is assigned to "BANK 3" to "BANK 15". In this case, for example, "0, 0, 1" is set in the first designation register, and "0, 0, 0" is set in the second and third designation registers. Further, "0, 1, 1" is set in the fourth to sixteenth designation registers. With this, when the mask ROM is accessed, the wait cycle of one state is automatically inserted, and when the dynamic RAM is accessed, the wait cycle of three states is automatically inserted. On the other hand, when the static RAM is accessed, no wait cycle is inserted. Thus, the system is constructed such that, dependent upon the access time of the memory device to be accessed, an optimum number of wait cycles are inserted into the access cycle to the bank for which the memory device to be accessed is mapped In the conventional memory management system as mentioned above, however, one designation register is required for each one of the hanks, and therefore, 16 designation registers are required for "BANK 0" to BANK 15" in the above mentioned example.

In addition, from the viewpoint of the program design, the same kind of memories are mapped to be continuous to each other. Therefore, it is necessary to set the same wait number into a plurality of designation registers corresponding to a corresponding number of banks of the same kind of memories used in the system. This lowers the efficiency of the program execution.

SUMMARY OF THE INVENTION

Accordingly, it is an object of the present invention to provide a memory control system which has overcome the above mentioned defect of the conventional memory management and control.

Another object of the present invention is to provide a memory control system having a high degree of versatility with a minimum amount of hardware.

The above and other objects of the present invention are achieved in accordance with the present invention by a memory control system comprising a plurality of base address designation means each for designating a base address for mapping a memory, a plurality of memory block size designation means each for designating the capacity of a memory area to be mapped with reference to the base address, so that a memory space control condition is managed on the basis of a plurality of memory blocks defined by the base address designation means and the memory block size designation means, and a memory block priority control means for determining the order of priority among the plurality of memory blocks.

Preferably, the memory control system further includes a default control means for managing the control condition of a memory space which is not included in any one of the plurality of memory blocks.

The above and other objects, features and advantages of the present invention will be apparent from the following description of preferred embodiments of the invention with reference to the accompanying drawings.

BRIEF DESCRIPTION OF THE DRAWINGS

FIG. 2 is a diagram illustrating an example of the base address register incorporated in the memory controller shown in FIG. 1;

FIG. 3 is a diagram illustrating an example of the block size register incorporated in the memory controller shown in FIG. 1;

FIG. 4 is a table showing the setting conditions of the base address registers and the block size registers;

DESCRIPTION OF THE PREFERRED EMBODIMENTS

Figure 1:
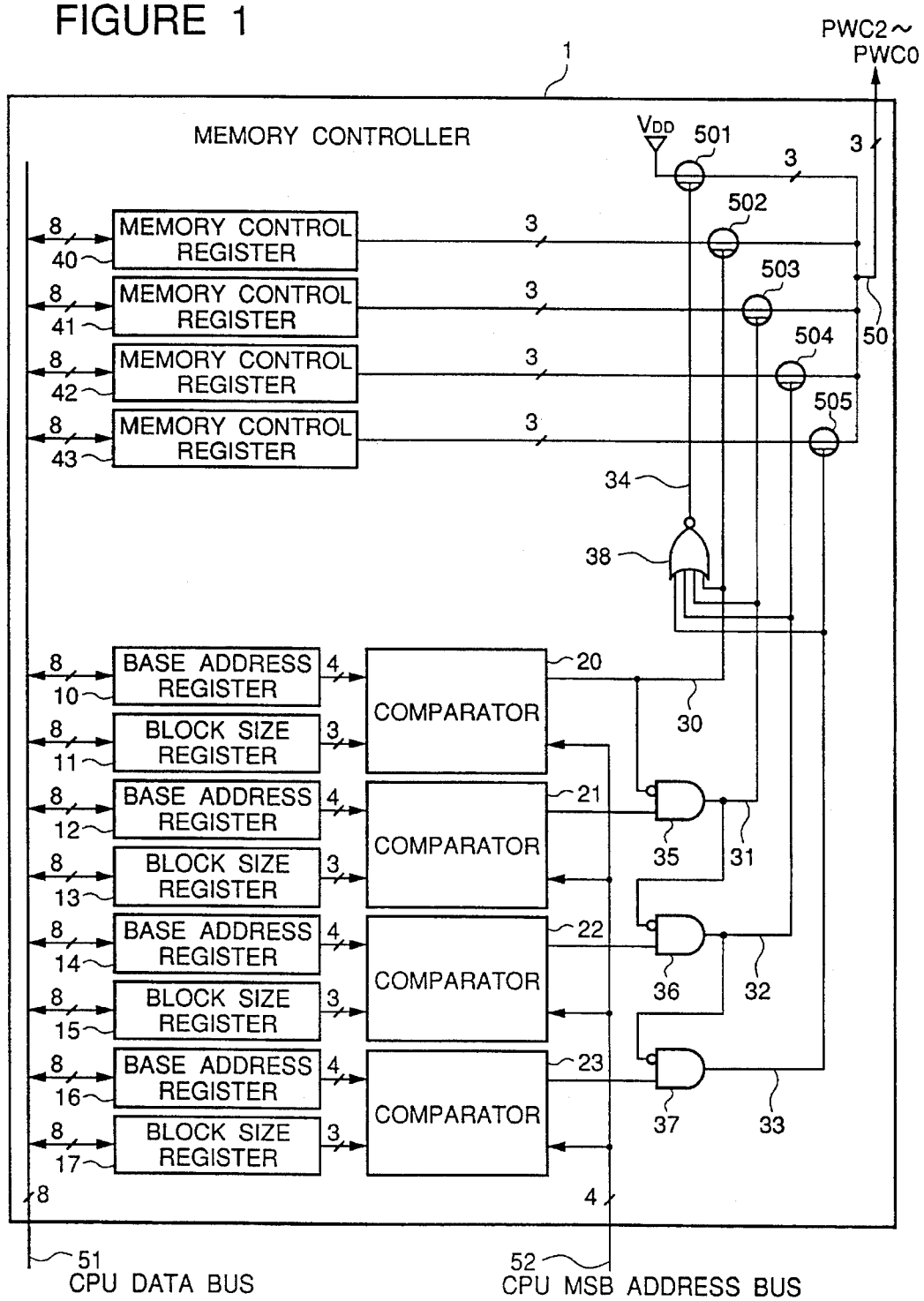
FIG. 1 is a block diagram of an embodiment of the memory controller in accordance with the present invention.

Referring to FIG. 1, there is shown a block diagram of an embodiment of the memory controller in accordance with the present invention, which can be incorporated in a microcomputer.

The shown memory controller is generally designated by Reference Numeral 1, and is configured to enable the microcomputer to access a memory space of 1M byte, and therefore, comprises a CPU address bus of 20 bits. In addition, there are provided four sets of registers, each set consisting of one base address register and one block size register, so that four memory blocks can be defined at maximum.

Each of base address registers 10, 12, 14 and 16 is composed of a 8-bit register coupled to a CPU data bus 51 of 8 bits, but is used as a four-bit register as shown in FIG. 2 for designating MSB bits of an address for the four memory blocks "BLOCK 0", "BLOCK 1", "BLOCK 2" and "BLOCK 3". On the other hand, each of block size registers 11, 13, 15 and 17 is composed of a 8-bit register coupled to the CPU data bus 51 of 8 bits, but is used as a three-bit register as shown in FIG. 3 for designating the capacity of the four memory blocks "BLOCK 0", "BLOCK 1", "BLOCK 2" and "BLOCK 3". The base address registers 10, 12, 14 and 16 and the block size registers 11, 13, 15 and 17 can be set by a CPU (central processing unit) (not shown) of the microcomputer.

The content of the base address register 10 as shown in FIG. 2 is used in combination with the content of the corresponding block size register 11 as shown in FIG. 3, in order to discriminate whether or not a memory access cycle being currently executed is directed to the memory block "BLOCK 0".

The number of bits among the four bits of the bag address register 10 is different dependent upon the capacity of the memory blocks. For example, if the block size is 64K byte, all the four bits "BA3" to "BA0" shown in FIG. 2 are used for the address comparison. If the block size is 256K byte, only the two bits "BA3" and "BA2" are used for the address comparison. This is true in the other base address registers 12, 14 and 16. All the four bits "BA3" to "BA0" of the base address registers 10, 12, 14 and 16 are reset or initialized to a logic value "0" at the time of a system resetting.

As shown in FIG. 3, the three bits "SZ2", SZ1" and "SZ0" of the block size register 11 are used for designating the capacity of the corresponding memory block in the range of 64K byte at minimum to 1M byte at maximum. This is true in the other block size registers 13, 15 and 17. All the three bits "SZ2", SZ1" and "SZ0" of the block size registers 11, 13, 15 and 17 are reset or initialized to a logic value "0" at the time of a system resetting.

The table of FIG. 4 shows the setting conditions of the base address registers and the block size registers.

Returning to FIG. 1, Reference Numeral 52 designates four MSB bits of the 20-bit CPU address bus (not shown), and access address information is outputted onto the CPU address bus at a timing where a CPU memory access cycle is generated.

The four MSB bits 52 of the 20-bit CPU address bus are connected to each of four comparators 20, 21, 22 and 23. In addition, four bit outputs of the base address register 10 and three bit outputs of the block size register 11 are coupled to the comparator 20, where the four bit outputs of the base address register 10 are compared with the value on the four MSB bits 52 of the 20-bit CPU address bus in the extend designated by the three bit outputs of the block size register 11, in order to discriminate whether or not a memory access cycle being currently executed is directed to the memory block "BLOCK 0". If the memory access cycle being currently executed is directed to the memory block "BLOCK 0", the comparator 20 generates an active coincidence signal 30 of a logic value "1".

Similarly, four bit outputs of the base address register 12 and three bit outputs of the block size register 13 are coupled to the comparator 21, and is compared with the value on the four MSB bits 52 of the 20-bit CPU address bus in order to discriminate whether or not a memory access cycle being currently executed is directed to the memory block "BLOCK 1". If the memory access cycle being currently executed is directed to the memory block "BLOCK 1", the comparator 21 generates an active output signal of a logic value "1", which is coupled to an non-inverting input of an AND gate 35. This AND gale 35 has an inverting input connected to the output of the comparator 20 so as to receive the coincidence signal 30 for the memory block "BLOCK 0". Thus, when the coincidence signal 30 for the memory block "BLOCK 0" is inactive (at a logic level "0") and when the comparator 21 discriminates that the memory access cycle being currently executed is directed to the memory block "BLOCK 1", the AND gate 35 generates an active coincidence signal 31 of a logic value "1".

In addition, the base address register 14 and the block size register 15 are coupled to the comparator 22, and is compared with the value on the four MSB bits 52 of the CPU address bus in order to discriminate whether or not a memory access cycle being currently executed is directed to the memory block "BLOCK 2". If the memory access cycle being currently executed is directed to the memory block "BLOCK 2", the comparator 22 generates an active output signal of a logic value "1", which is coupled to a non-inverting input of an AND gate 36. This AND gate 36 has an inverting input connected to the output of the AND gate 35 so as to receive the coincidence signal 31 for the memory block "BLOCK 1". Accordingly, when the coincidence signal 31 for the memory block "BLOCK 1" is inactive (at a logic level "0") and when the comparator 22 discriminates that the memory access cycle being currently executed is directed to the memory block "BLOCK 2", the AND gate 36 generates an active coincidence signal 32 of a logic value "1".

The base address register 16 and the block size register 17 are coupled to the comparator 23, and is compared with the value on the four MSB bits 52 of the CPU address bus in order to discriminate whether or not a memory access cycle being currently executed is directed to the memory block "BLOCK 3". If the memory access cycle being currently executed is directed to the memory block "BLOCK 3", the comparator 23 generates an active output signal of a logic value "1", which is coupled to a non-inverting input of an AND gate 37. This AND gate 37 has an inverting input connected to the output of the AND gate 36 so as to receive the coincidence signal 32 for the memory block "BLOCK 2". Thus, when the coincidence signal 32 for the memory block "BLOCK 2" is inactive (at a logic level "0") and when the comparator 24 discriminates that the memory access cycle being currently executed is directed to the memory block "BLOCK 3", the AND gate 37 generates an active coincidence signal 33 of a logic value "1".

Thus, the memory blocks are given the following order of priority by the hardware:

MEMORY BLOCK 0>MEMORY BLOCK 1>MEMORY BLOCK 2>MEMORY BLOCK 3

In other words, the coincidence signal for each memory block is exclusively generated, and a plurality of coincidence signals are in no way simultaneously rendered active (logic level "1")

Figure 5:
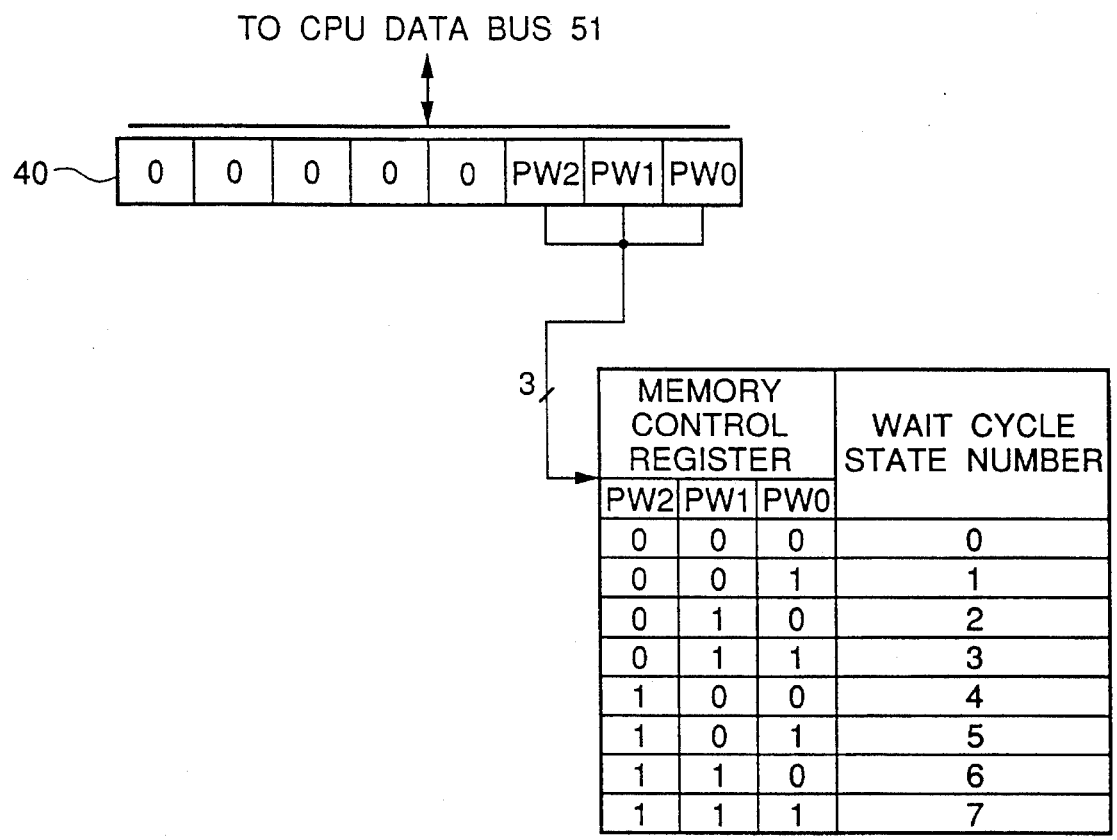
FIG. 5 is a diagram illustrating an example of the memory control register incorporated in the memory controller shown in FIG. 1 and the setting condition for the memory control register.

The shown memory controller includes four memory control registers 40, 41, 42 and 44, each of which is composed of a 8-bit register coupled to the CPU data bus 51 of 8 bits, but is used as a three-bit register for designating the number of wait states to be inserted for the corresponding memory block "BLOCK 0", "BLOCK 1", "BLOCK 2" or "BLOCK 3". As shown in FIG. 5, three bits "PWC2", "PWC1" and "PWC0" of the memory control register 40 designate the number of wait states to be inserted in the memory access performed for the memory block "BLOCK 0". If the three bits "PWC2", "PWC1" and "PWC0" are "0, 0, 0", the number of wait states to be inserted is 0 (zero) as shown in the table of FIG. 5, and if the three bits "PWC2", "PWC1" and "PWC0" are "0, 1, 0", the number of wait states to be inserted is 2. This is true in the other memory control registers 41, 42 and 44.

These memory control registers 40, 41, 42 and 44 can be set through the CPU data bus 51 by the not-shown CPU. An output of the memory control registers 40, 41, 42 and 44 is connected to a corresponding transfer gate 502, 503, 504 and 505 to a common node. The transfer gates 502, 503, 504 and 505 are controlled by the coincidence signals 30, 31, 32 and 33 for the memory block, respectively, and the common node is pulled up through another transfer gate 501, which is controlled by a default signal outputted from an NOR gate 38 receiving all the by the coincidence signals 30, 31, 32 and 33 for the memory block. Thus, a wait state signal 50 of three bits "PWC2", "PWC1" and "PWC0" is generated on the common node.

For example, when the coincidence signal 31 is active (logic level "1"), the three-bit output of the memory control register 41 is outputted as the wait state signal 50. If the address to be accessed is not included in any one of the designated memory blocks, all the coincidence signals 30 to 33 are inactive (logic level "0"), so that the NOR gate 38 generates an active default designation signal 34 of a logic level "1". Therefore, the transfer gate 501 connected to a voltage supply voltage $V_{DD}$ is turned on, so that the common node is brought to a logic level "1". Accordingly, the wait state signal 50 of all bits of "1" is outputted.

Figure 6:
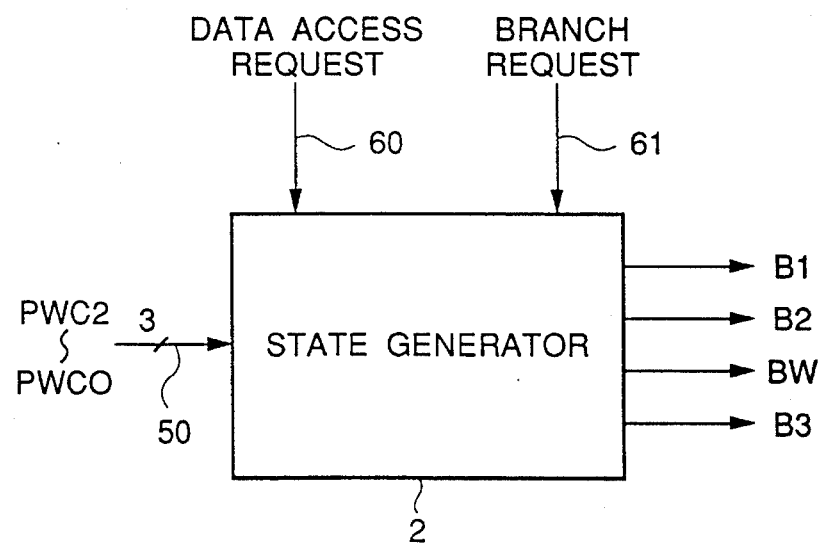
FIG. 6 is a diagram of the state generator to be connected to the memory controller.

Referring to FIG. 6, there is shown a diagram of a state generator 2 which receives the wait state signal 50 from the memory controller 1 shown in FIG. 1, and which generates state signals for the memory access cycle. This state generator 2 is constructed as a portion of an internal hardware of the not-shown CPU. The state generator 2 receives a data access request 60 and a branch request 61 which are generated in an internal of the not-shown CPU. In particular, the branch request 61 is generated in the course of execution of a branch instruction. If the state generator 2 receives the data access request 60 or the branch request 61, the state generator 2 internally generates a memory access cycle. If neither the data access request 60 nor the branch request 61 exists, the state generator 2 itself generates a memory access cycle for an instruction fetching. In an ordinary memory access cycle, state signals "B1", "B2" and "B3" are sequentially generated for various controls for the memory access, for example, generation of a strobe signal in the CPU.

In addition, in response to the wait state signal 50 ("PWC2", "PWC1" and "PWC0") from the memory controller 1, the state generator 2 inserts a predetermined wait cycle into the state signals "B1", "B2" and "B3".

Figure 7A:
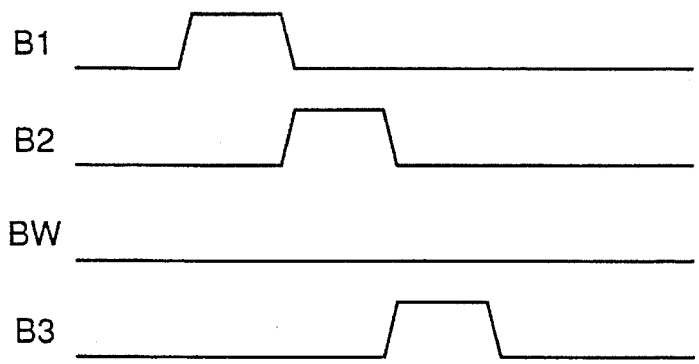
FIGS. 7A, 7B and 7C are timing charts illustrating three different memory access cycles.
Figure 7B:
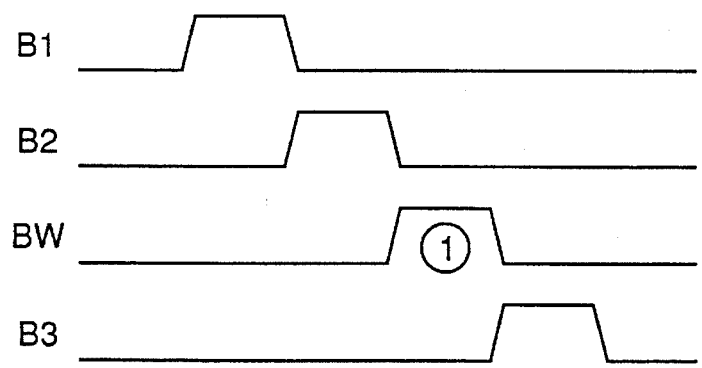
Figure 7C:
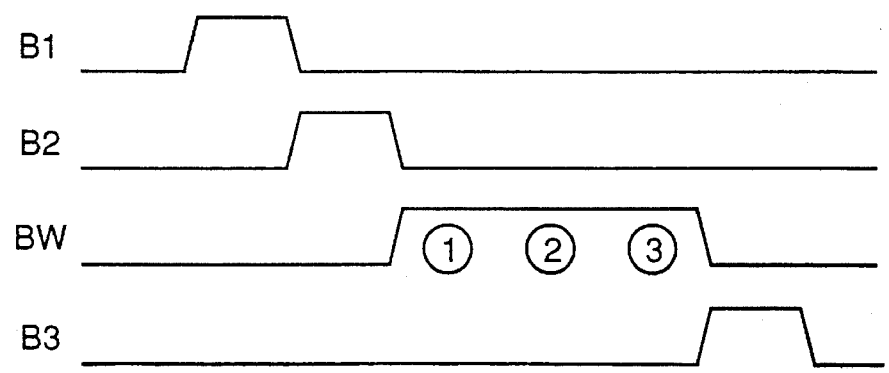

Referring to FIGS. 7A, 7B and 7C, them are shown a timing chart illustrating three different memory access cycles. As shown in FIG. 7A, if "PWC2", "PWC1" and "PWC0" of the wait state signal 50 are "0, 0, 0", the memory access cycle is constituted of only the state signals "B1", "B2" and "B3", and therefore, no wait cycle is inserted. As shown in FIG. 7B, if "PWC2", "PWC1" and "PWC0" of the wait state signal 50 are "0, 0, 1", the memory access cycle is constituted of only the state signals "B1", "B2", "BW" and "B3", and therefore, the wait cycle of one state is inserted between the state signals "B2" and "B3". Similarly, as shown in FIG. 7C, if "PWC2", "PWC1" and "PWC0" of the wait state signal 50 are "0, 1, 1", the memory access cycle is constituted of only the state signals "B1", "B2", "BW", "BW", "BW" and "B3", and therefore, the wait cycle of three states is inserted between the state signals "B2" and "B3".

All bits "PWC2", "PWC1" and "PWC0" of the memory control registers 40, 41, 42 and 43 are reset or initialized to a logic value "1" at the time of a system resetting. Therefore, just after the resetting, "PWC2", "PWC1" and "PWC0" become "1, 1, 1", so that the wait cycle of seven states is inserted into the memory access cycle.

Figure 8A:
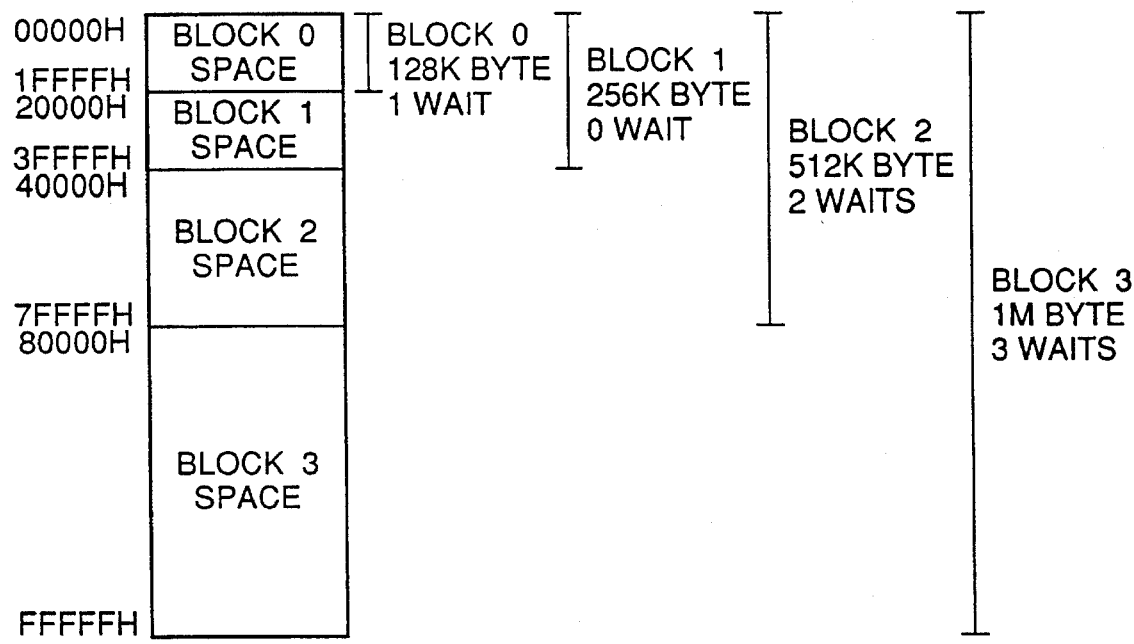
FIGS. 8A and 8B illustrate two different examples of the memory block setting.
Figure 8B:
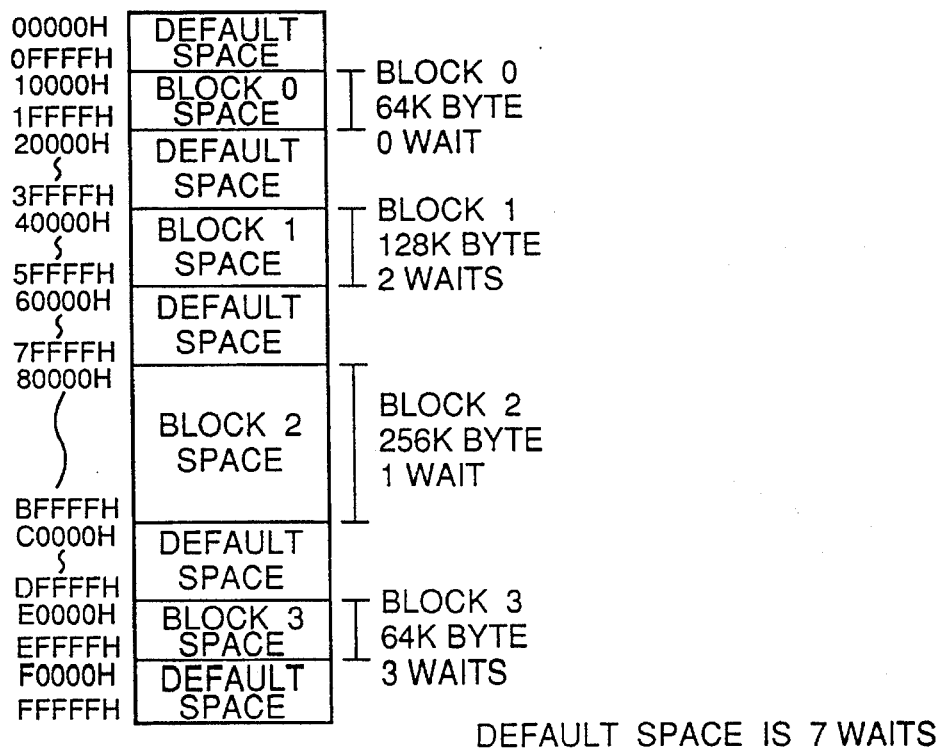

Referring to FIGS. 8A and 8B, two examples of the memory block setting are illustrated. In the example shown in FIG. 8A, the memory space of 1M-byte is divided into four memory blocks which are overlapped each other. The memory block "BLOCK 0" is composed of 128K-byte from "00000H" to "1FFFFH" where the suffix "H" indicates a hexadecimal notation, and requires one wait cycle for the memory access cycle. The memory block "BLOCK 1" is composed of 256K-byte from "00000H" to "3FFFFH", and requires no wait cycle for the memory access cycle. The memory block "BLOCK 2" is composed of 512K-byte from "00000H" to "7FFFFH", and requires two wait cycles for the memory access cycle. The memory block "BLOCK 3" is composed of 1M-byte from "00000H" to "FFFFFH", and requires three wait cycles for the memory access cycle.

In the example shown in FIG. 8B, the memory space of 1M-byte is divided into nine memory blocks which are not overlapped each other. The memory block "BLOCK 0" is composed of 64K-byte from "10000H" to "1FFFFH", and requires no wait cycle for the memory access cycle. The memory block "BLOCK 1" is composed of 128K-byte from "40000H" to "5FFFFH", and requires two wait cycles for the memory access cycle. The memory block "BLOCK 2" is compound of 256K-byte from "80000H" to "BFFFFH", and requires one wait cycle for the memory access cycle. The memory block "BLOCK 3" is composed of 64K-byte from "E0000H" to "EFFFFH", and requires three wait cycles for the memory access cycle. The remaining memory space is assigned to a default space.

As mentioned above, the shown embodiment is so constructed that the memory space of 1M byte is divided into four four memory blocks each having a size in the range of 64K byte to 1M byte, and the wait state number can be independently designated for each of the four memory blocks obtained by dividing one memory space into four. In addition, the starting address of each memory block can be independently designated. Since the order of priority is given to the memory blocks, even if the memory space is divided into a plurality of memory blocks which are overlapped each other. The memory access control can be properly performed for each of the memory blocks. Furthermore, the memory space can be divided into nine memory blocks at maximum.

In the shown embodiment, the minimum size of the memory block is 64K byte. However, the minimum size of the memory block can be made to 32K byte, 16K byte, 8K byte, or others, by adding the setting condition for the block size register, and expanding the bit length of the bag address registers by one bit to a few bits. It would be apparent to persons skilled in the art that even if the memory space is greater than 1M byte or less than 1M byte, the memory controller can be realized with the same construction with adding neither register nor other circuit elements.

Figure 9:
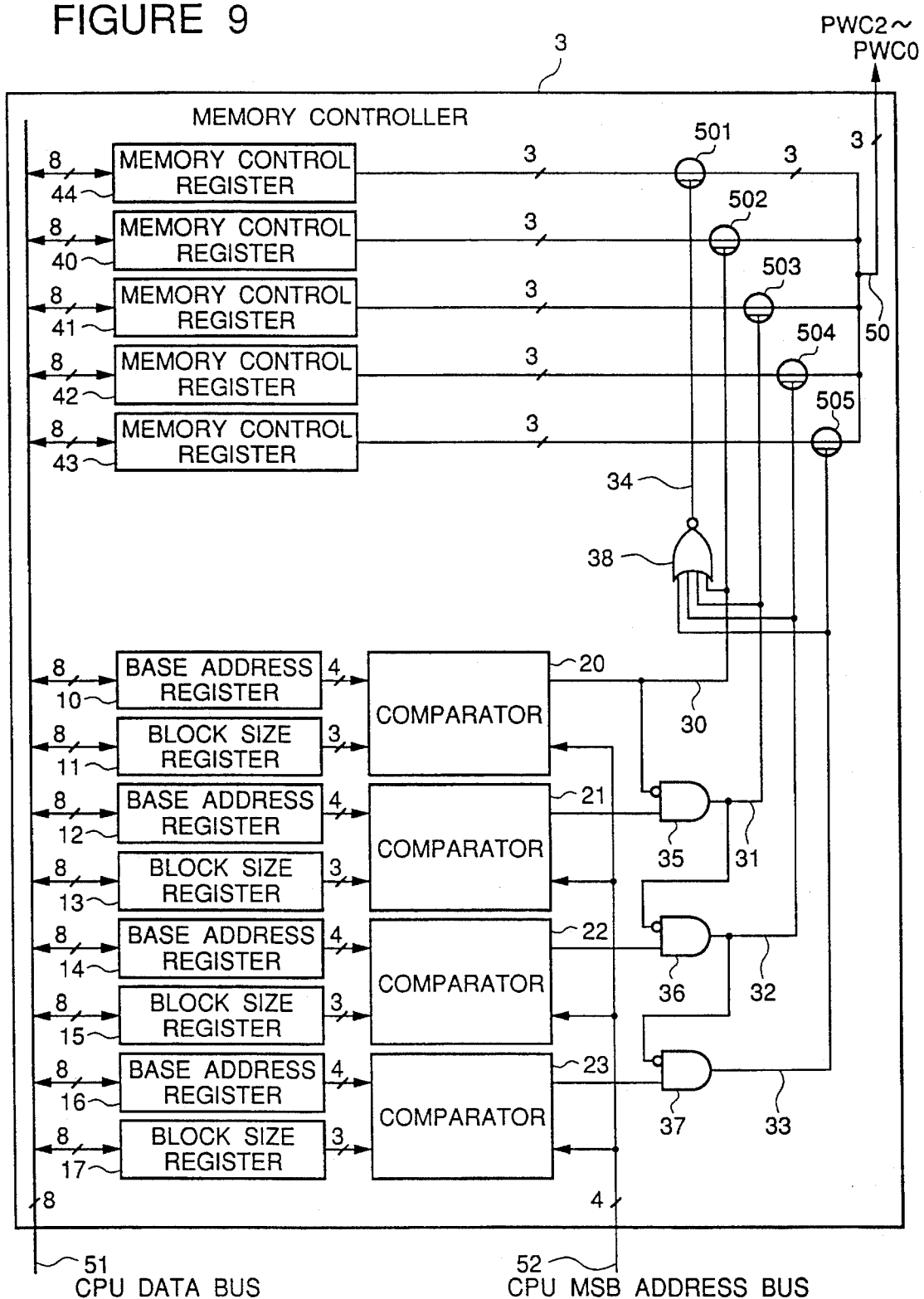
FIG. 9 is a block diagram of an embodiment of the memory controller in accordance with the present invention.

Referring to FIG. 9, there is shown a block diagram of an embodiment of the memory controller in accordance with the present invention. In FIG. 9, elements similar or corresponding to those shown in FIG. 1 are given the same Reference Numerals, and explanation thereof will be omitted.

The second embodiment is configured to insert a wait state defined by a condition previously set in a register for a default space when the memory access is performed to the memory space which is not included in any one of the memory blocks.

For this purpose, the second embodiment includes a memory control register 44 in addition to the construction of the first embodiment. An output of this memory control register 44 is connected to the transfer gate 501 in place of the voltage supply voltage $V_{DD}$. Therefore, when the default designation signal 34 becomes active (logic value "1"), the bit output of the memory control register 44 is selected and outputted as the wait state signal 50. The operation of the second embodiment other than the operation of the memory control register 44 and its related portion is the same as that of the first embodiment, and therefore, further explanation will be omitted.

Similarly to the memory control registers 40, 41, 42 and 44, the memory control register 44 is composed of a 8-bit register coupled to the CPU data bus 51 of 8 bits, but is used as a three-bit register for designating the number of wait states to be inserted for a memory region which is not included in any one of the memory blocks "BLOCK 0", "BLOCK 1", "BLOCK 2" and "BLOCK 3". The memory control register 44 is set by the not-shown CPU through the CPU data bus 51. The three-bit output of the memory control register 44 is outputted as the wait state signal 50 when all the coincidence signals 30, 31, 32 and 33 are inactive (logic level "0") and therefore, the default designation signal 34 outputted from the NOR gate 38 is active (logic level "1").

Therefore, when the memory space is divided as shown in FIG. 8B, it is possible to set any selected wait cycle state number for the default space. For example, if the memory control register 44 is set with "PWC2", "PWC1" and "PWC0"="0, 0, 1", the wait cycle of only one state is inserted into the memory access cycles for the default space.

As will be apparent from the above description with reference to the embodiments, the memory control system in accordance with the present invention can define different memory blocks with a setting condition corresponding to an actual memory capacity of each memory device such as 64K byte, 128K byte, etc. and also can independently designate the wait state number for each of the memory blocks. Accordingly, the system can be constructed with a minimum amount of hardware and a minimum program setting which correspond to the memory construction of the system.

Furthermore, since the order of priority is given to a plurality of memory blocks, a very variety of memory constructions can be realized with a minimum number of memory blocks. Therefore, the memory control system in accordance with the present invention is very excellent in economy and in versatility.

The invention has thus been shown and described with reference to the specific embodiments. However, it should be noted that the present invention is in no way limited to the details of the illustrated structures but changes and modifications may be made within the scope of the appended claims.

I claim:

1. A memory control system comprising:

a plurality of base address register means each for storing a base address for a corresponding one of a plurality of memory blocks, a plurality of memory block size register means each for storing a capacity of a corresponding memory block calculated with reference to said base address, a plurality of memory control registers each storing a wait data for a corresponding one of said plurality of memory blocks, a memory block priority control means for determining the order of priority among said plurality of memory blocks, said memory block priority control means comprising comparator means for matching a requested address to one of said plurality of memory blocks and outputting a signal to a corresponding one of said plurality of memory control registers storing a wait data; and default control means for managing a control condition of a memory space which is not included in any one of said memory blocks.

2. A memory control system for controlling an access to a plurality of memory blocks, comprising:

a plurality of memory control registers each for designating a wait state number for a corresponding memory block of said plurality of memory blocks;

a plurality of base address registers each for designating a base address of a corresponding memory block of said plurality of memory blocks;

a corresponding number of block size registers each for designating the size of a corresponding memory block of said plurality of memory blocks;

a corresponding number of comparators for receiving most significant bits of a memory access address, each of said comparators also receiving an output of a corresponding base address register and an output of a corresponding block size register for generating a coincidence signal when it is determined that the corresponding memory block is to be accessed;

a priority order control means receiving the outputs of said comparators and the outputs of said memory control registers, said priority order control means for causing one of said plurality of memory control registers to output a wait state stored therein; and default control means for managing a control condition of a memory space which is not included in any one of said memory blocks.

3. A memory control system for controlling an access to a plurality of memory blocks as recited in claim 2 wherein said priority order control means comprises:

a first AND gate receiving inputs from a first and a second comparator;

a second AND gate receiving inputs from an output of said first AND gate and a third comparator; and a third AND gate receiving an input from an output of said third comparator and a fourth comparator, said first comparator outputting a first coincidence signal, said first AND gate outputting a second coincidence signal, said second AND gate outputting a third coincidence signal, and said third AND gate outputting a fourth coincidence signal, said first, second, and third AND gates causing only one of said first, second, third, and fourth coincidence signals to be active at a time.

4. A memory control system for controlling an access to a plurality of memory blocks as recited in claim 2 further comprising an OR circuit for selecting a default wait state if said first, second, third, and fourth coincidence signals are inactive.

5. A wait-cycle memory controller for controlling wait cycles for a memory partitioned into a plurality of blocks, comprising:

a plurality of memory control registers each for storing a wait data for a corresponding block in a memory;

a plurality of block registers for defining a starting address and a size of a corresponding block in memory;

a plurality of comparators, connected between said plurality of memory control registers and said plurality of block registers, for determining when a requested memory address is located in a corresponding one of said plurality of memory blocks, and for causing a corresponding one of said plurality of control registers to output said wait data; and default control means for managing a control coindition of a memory space which is not include in any one of said memory blocks.

6. A wait-cycle memory controller for controlling wait cycles for a memory partitioned into a plurality of blocks as recited in claim 5 wherein each of said plurality of block registers comprises:

a base address register for storing a starting address for a block in memory; and a block size register for storing size data for said block in memory.

7. A wait-cycle memory controller for controlling wait cycles for a memory partitioned into a plurality of blocks as recited in claim 5 further comprising logic means for causing only one of said plurality of memory control registers to output said wait data.

8. A wait-cycle memory controller for controlling wait cycles for a memory partitioned into a plurality of blocks as recited in claim 7 wherein said logic means comprises:

a first AND gate receiving an input from a first and a second comparator;

a second AND gate receiving an output of said first AND gate and a third comparator; and a third AND gate receiving an output of said third comparator and a fourth comparator, wherein said first comparator outputs a first coincidence signal to a first memory control register, said first AND gate outputs a second coincidence signal to a second memory control register, said second AND gate outputs a third coincidence signal to a third memory control register, and said third AND gate outputs a fourth coincidence signal to a third memory control register, said first, second, and third AND gates causing only one of said first, second, third, and fourth coincidence signals to be active at a time.

9. A wait-cycle memory controller for controlling wait cycles for a memory partitioned into a plurality of blocks as recited in claim 8 wherein said default control means comprises an OR circuit for selecting a default wait state if said first, second, third, and fourth coincidence signals are inactive.

* * * * *